United States Patent
Fang et al.

(10) Patent No.: US 10,698,837 B2
(45) Date of Patent: Jun. 30, 2020

(54) MEMORY PROCESSING METHOD AND DEVICE AND STORAGE MEDIUM

(71) Applicant: GUANGDONG OPPO MOBILE TELECOMMUNICATIONS CORP., LTD., Dongguan (CN)

(72) Inventors: Pan Fang, Dongguan (CN); Yan Chen, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 139 days.

(21) Appl. No.: 16/138,439

(22) Filed: Sep. 21, 2018

(65) Prior Publication Data
US 2019/0205265 A1    Jul. 4, 2019

(30) Foreign Application Priority Data

Dec. 29, 2017 (CN) .......................... 2017 1 1489135

(51) Int. Cl.
*G06F 12/12* (2016.01)
*G06F 12/123* (2016.01)
(Continued)

(52) U.S. Cl.
CPC .......... *G06F 12/124* (2013.01); *G06F 9/4843* (2013.01); *G06F 9/5022* (2013.01);
(Continued)

(58) Field of Classification Search
CPC ................. G06F 9/4843; G06F 9/5022; G06F 2212/1024; G06F 2212/1044; G06F 2212/502
See application file for complete search history.

(56) References Cited

U.S. PATENT DOCUMENTS 5,592,432 A    1/1997 Vishlitzky
5,787,473 A    7/1998 Vishlitzky
(Continued)

FOREIGN PATENT DOCUMENTS

CN    101833512 A    9/2010
CN    105760225 A    7/2016
(Continued)

OTHER PUBLICATIONS

W. Zhang, H. Xie and C. Hsu, "Automatic Memory Control of Multiple Virtual Machines on a Consolidated Server," in IEEE Transactions on Cloud Computing, vol. 5, No. 1, pp. 2-14, Jan. 1-Mar. 2017. (Year: 2017).*

(Continued)

*Primary Examiner* — Khoa D Doan
(74) *Attorney, Agent, or Firm* — Ladas & Parry, LLP

(57) ABSTRACT

The disclosure relates to a method for processing a memory and apparatus, an electronic device, and a computer-readable storage medium. The method includes acquiring reclaimable memory pages occupied by an application to be processed; acquiring an idle duration of the application to be processed for each reclaimable memory page; determining a duration threshold according to the idle durations for the reclaimable memory pages; and selecting from the reclaimable memory pages a memory page for which the idle duration exceeds the duration threshold and reclaiming the memory page. The above-mentioned method for processing a memory and apparatus, electronic device and computer-readable storage medium may minimize the adverse impact on each application, thereby maintaining the balance between reclaiming and operation of an application memory to be processed.

14 Claims, 7 Drawing Sheets

(51) Int. Cl.
  *G06F 11/34* (2006.01)
  *G06F 9/50* (2006.01)
  *G06F 9/48* (2006.01)
  *G06F 12/02* (2006.01)

(52) U.S. Cl.
  CPC ........ *G06F 11/3419* (2013.01); *G06F 12/123* (2013.01); *G06F 12/0253* (2013.01); *G06F 2212/1024* (2013.01); *G06F 2212/1044* (2013.01); *G06F 2212/502* (2013.01)

(56) References Cited

U.S. PATENT DOCUMENTS

| | | | |
|---|---|---|---|
| 9,535,768 B2* | 1/2017 | Reis | G06F 9/4843 |
| 9,747,028 B1* | 8/2017 | Allen | G06F 9/45558 |
| 9,747,222 B1 | 8/2017 | Armangau et al. | |
| 2002/0108017 A1* | 8/2002 | Kenchammana-Hoskote | G06F 12/0804 711/113 |
| 2002/0108020 A1* | 8/2002 | Take | G06F 12/0866 711/119 |
| 2006/0129780 A1* | 6/2006 | Dunshea | G06F 12/1009 711/170 |
| 2006/0184718 A1* | 8/2006 | Sinclair | G06F 3/0608 711/103 |
| 2010/0017576 A1* | 1/2010 | Bomma | G06F 9/45537 711/163 |
| 2013/0326168 A1* | 12/2013 | Chang | G06F 9/485 711/160 |
| 2016/0321183 A1* | 11/2016 | Govindan | G06F 12/0862 |
| 2017/0123700 A1* | 5/2017 | Sinha | G06F 3/065 |
| 2018/0307600 A1* | 10/2018 | Wang | G06F 12/0253 |
| 2019/0205266 A1* | 7/2019 | Fang | G06F 9/5022 |
| 2019/0220318 A1* | 7/2019 | Yang | G06F 9/5016 |
| 2019/0370171 A1* | 12/2019 | Desai | G06F 12/127 |

FOREIGN PATENT DOCUMENTS

| | | |
|---|---|---|
| CN | 106250223 A | 12/2016 |
| CN | 107220076 A | 9/2017 |
| EP | 0919927 A2 | 6/1999 |
| WO | 2017114288 A1 | 7/2017 |

OTHER PUBLICATIONS

International Search Report in international application No. PCT/CN2018/112067, dated Jan. 25, 2019.
Written Opinion of the International Search Authority in international application No. PCT/CN2018/112067, dated Jan. 25, 2019.
Supplementary European Search Report in the European application No. 18201257.5, dated Apr. 25, 2019.
Vivek Narasayya et al : "Sharing buffer pool memory in multi-tenant relational database-as-a-service", Proceedings of the VLDB Endowment; [ACM Digital Library], Assoc. of Computing Machinery, New York, NY, vol. 8, No. 7, Feb. 1, 2015, pp. 726-737, XP058067355, ISSN: 2150-8097, DOI: 10.14778/2752939. 2752942.
Ahmed Hussein et al: "One Process to Reap Them All ", Virtual Execution Environments, ACM, 2 Penn Plaza, Suite 701 New York NY 10121-0701 USA, Apr. 8, 2017, pp. 171-186, XP058327086, DOI: 10.1145/3050748.3050754 ISBN: 978-1-4503-4948-2.
Kan Zhong et al: "Building NVRAM-Aware Swapping Through Code Migration in Mobile Devices", IEEE Transactions on Parallel and Distributed Systems., vol. •.28, No. 11, Nov. 1, 2017, 3089-3099, XP055522583, US ISSN: 1045-9219, DOI: 10 .1109/TPDS. 2017. 2713780.
Xiaoning Ding et al: "A buffer cache management scheme exploiting both temporal and spatial localities", ACM Transactions on Storage, Association for Computing Machinery, New York, NY, US, vol. 3, No. 2, Jun. 1, 2007, pp. 5-es, XP058106799, ISSN: 1553-3077, DOI: 10.1i45/1242520.1242522.

* cited by examiner

MEMORY PROCESSING METHOD AND DEVICE AND STORAGE MEDIUM

CROSS-REFERENCE TO RELATED APPLICATIONS

This application is filed based upon and claims priority to Chinese Patent Application No. 201711489135.9, entitled "Memory Processing Method and Device, Electronic Device and Computer-readable Storage Medium", filed on Dec. 29, 2017, the entire contents of which are incorporated herein by reference.

TECHNICAL FIELD

The disclosure relates to the field of data processing, and in particular to a method and device for processing a memory, and a computer-readable storage medium.

BACKGROUND

When an application installed on an electronic device operates, a certain memory needs to be occupied. The memory is a main data storage medium of an application during operation. Since the memory capacity of the electronic device is limited, when the memory occupied by background applications is excessive, the operation efficiency of a foreground application may be affected. Therefore, it is necessary to reclaim the memory, so as to improve the operation efficiency of the foreground application.

A related method for processing a memory is to totally reclaim memories occupied by a single application operating in the background. However, it is necessary to reload almost all reclaimed memories during the next starting and execution process after the memories used by a single application are completely reclaimed, resulting in the remarkable reduction of the operation speed of a memory-reclaimed application.

SUMMARY

The embodiments of the disclosure provide a method for processing a memory and apparatus, and a computer-readable storage medium In a first aspect, there is provided a method for processing a memory. The method is carried out by an electronic device. In the method, multiple reclaimable memory pages occupied by an application to be processed are acquired, an idle duration of the application to be processed for each reclaimable memory page is acquired, a duration threshold according to the idle durations for the reclaimable memory pages is determined, and at least one memory page, for which the idle duration exceeds the duration threshold, of the plurality of reclaimable memory pages is reclaimed.

In a second aspect, there is provided an electronic device including a storage having stored thereon a computer program and a processor. The storage has stored thereon a computer program that when executed by the processor causes the processor to: acquire a plurality of reclaimable memory pages occupied by an application to be processed; acquire an idle duration of the application to be processed for each reclaimable memory page; determine a duration threshold according to the idle durations for the reclaimable memory pages; and reclaim at least one memory page, for which the idle duration exceeds the duration threshold, of the plurality of reclaimable memory pages.

In a third aspect, there is provided a non-transitory computer-readable storage medium having a computer program stored thereon that when executed by a processor, causes the processor to implement a method according to the first aspect.

BRIEF DESCRIPTION OF DRAWINGS

In order to describe the technical solutions in the embodiments of the disclosure or related art more clearly, the drawings required to be used in descriptions about the embodiments or the related art will be simply introduced below. It is apparent that the drawings in the following descriptions are only some embodiments of the disclosure. Those of ordinary skilled in the art may further obtain other drawings according to these drawings without creative work.

DETAILED DESCRIPTION

Figure 1:
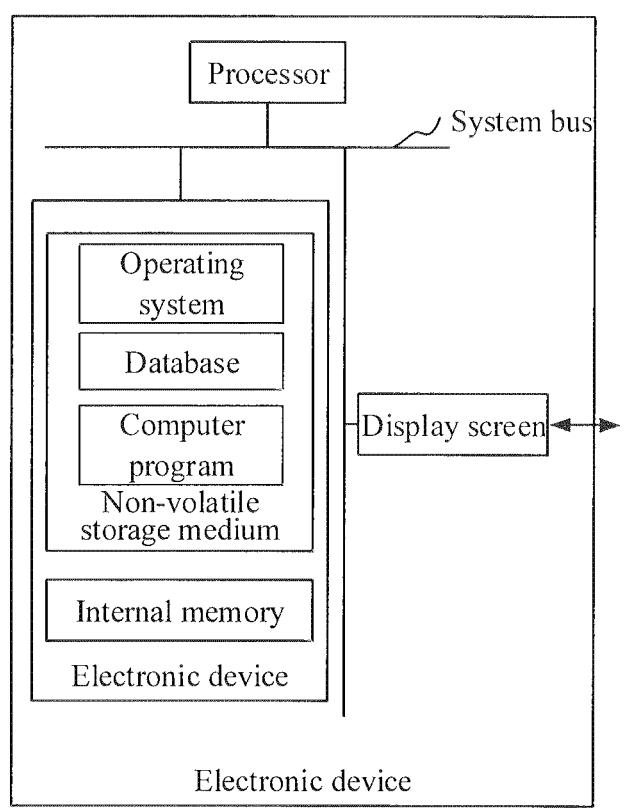
FIG. 1 is an internal structure diagram of an electronic device in accordance to an embodiment.

In order to make the objectives, technical solutions and advantages of the disclosure clearer, the disclosure will be further elaborated below in conjunction with the drawings and the embodiments. It will be appreciated that specific embodiments described here are only used to explain the disclosure, not to limit the disclosure.

The embodiments of the disclosure provide at least the following solutions.

Solution 1. A method for processing a memory, the method being carried out by an electronic device, and including:

acquiring a plurality of reclaimable memory pages occupied by an application to be processed;

acquiring an idle duration of the application to be processed for each reclaimable memory page;

determining a duration threshold according to the idle durations for the reclaimable memory pages; and reclaiming at least one memory page, for which the idle duration exceeds the duration threshold, of the plurality of reclaimable memory pages.

Solution 2. The method of solution 1, wherein acquiring an idle duration of the application to be processed for each reclaimable memory page includes:

acquiring update time recorded by a timestamp of each reclaimable memory page, the update time indicating time when the reclaimable memory page was used most recently; and calculating an idle duration for the reclaimable memory page according to the update time.

Solution 3. The method of solution 2, wherein the acquiring update time recorded by a timestamp of each reclaimable memory page includes:

for each reclaimable memory page, creating, by a resource priority and limitation management module in the electronic device, a timestamp for recording an update time of the reclaimable memory page; and in responsive to that use of the reclaimable memory page is detected, updating the time stamp for the reclaimable memory page.

Solution 4. The method of solution 3, wherein the use of the reclaimable memory page is detected when at least one of allocation of the reclaimable memory page, recovery of the reclaimable memory page, release of the reclaimable memory page, or querying of using condition of a cache in a processor of the electronic device is detected.

Solution 5. The method of solution 1, wherein acquiring an idle duration of the application to be processed for each reclaimable memory page includes:

providing a Least Recently Used (LRU) management unit in a memory management unit or a cache unit in a processor of the electronic device;

recording, by the LRU management unit, a plurality of memory addresses and update time of each memory address;

acquiring an update time of each of the plurality of reclaimable memory pages according to an update time of a memory address corresponding to the reclaimable memory page; and calculating an idle duration for the reclaimable memory page according to the update time of the reclaimable memory page.

Solution 6. The method of solution 1, wherein determining a duration threshold according to the idle durations for the plurality of reclaimable memory pages includes:

calculating an average idle duration of the application to be processed for the reclaimable memory pages according to the idle durations for the reclaimable memory pages, and taking the average idle duration as a duration threshold.

Solution 7. The method of solution 1, wherein determining a duration threshold according to the idle durations for the plurality of reclaimable memory pages includes:

acquiring a reclaiming number of reclaimable memory pages; and selecting the Kth-largest idle duration from the idle durations for the plurality of reclaimable memory pages according to the reclaiming number, and taking the Kth-largest idle duration as a duration threshold, the number of reclaimable memory pages each having an idle duration greater than the Kth-largest idle duration being the reclaiming number, K being a natural number not greater than the reclaiming number.

Solution 8. The method of solution 7, wherein acquiring a reclaiming number of reclaimable memory pages includes:

acquiring correspondences between re-starting durations and reclaiming proportions corresponding to the application to be processed, the re-starting duration being a duration for restarting the application to be processed after the reclaiming proportion of the reclaimable memory pages occupied by the application to be processed are reclaimed;

determining a reclaiming proportion of reclaimable memory pages according to the correspondences between reclaiming proportions and re-starting durations; and determining a reclaiming number according to the reclaiming proportion and the total number of the reclaimable memory pages.

Solution 9. The method of solution 1, wherein the acquiring a plurality of reclaimable memory pages occupied by an application to be processed includes:

traversing a plurality of memory-mapped files of the application to be processed;

querying, in the plurality of memory-mapped files, all memory pages occupied by the application to be processed; and eliminating a memory page carrying an occupation mark from all the memory pages to acquire reclaimable memory pages from memory pages other than the eliminated memory page.

Solution 10. The method of solution 1, wherein before acquiring reclaimable memory pages occupied by an application to be processed, the method further includes:

detecting whether a foreground application depends on the application to be processed;

if a foreground application depends on the application to be processed, adjusting the priority of the application to be processed to match the foreground application; and if a foreground application does not depend on the application to be processed, performing the operation of acquiring reclaimable memory pages occupied by an application to be processed.

Solution 11. An electronic device including a storage having stored thereon a computer program and a processor, the storage having stored thereon a computer program that when executed by the processor causes the processor to:

acquire a plurality of reclaimable memory pages occupied by an application to be processed;

acquire an idle duration of the application to be processed for each reclaimable memory page;

determine a duration threshold according to the idle durations for the reclaimable memory pages; and reclaim at least one memory page, for which the idle duration exceeds the duration threshold, of the plurality of reclaimable memory pages.

Solution 12. The electronic device of solution 11, wherein acquiring an idle duration of the application to be processed for each reclaimable memory page includes:

acquiring update time recorded by a timestamp of each reclaimable memory page, the update time indicating time when the reclaimable memory page was used most recently; and calculating an idle duration for the reclaimable memory page according to the update time.

Solution 13. The electronic device of solution 12, wherein the acquiring update time recorded by a timestamp of each reclaimable memory page includes:

for each reclaimable memory page, creating, by a resource priority and limitation management module in the electronic device, a timestamp for recording an update time of the reclaimable memory page; and in responsive to that use of the reclaimable memory page is detected, updating the time stamp for the reclaimable memory page.

Solution 14. The electronic device of solution 13, wherein the use of the reclaimable memory page is detected when at least one of allocation of the reclaimable memory page, recovery of the reclaimable memory page, release of the reclaimable memory page, or querying of using condition of a cache in a processor of the electronic device is detected.

Solution 15. The electronic device of solution 11, wherein acquiring an idle duration of the application to be processed for each reclaimable memory page includes:

providing a Least Recently Used (LRU) management unit in a memory management unit or a cache unit in a processor of the electronic device;

recording, by the LRU management unit, a plurality of memory addresses and update time of each memory address;

acquiring an update time of each of the plurality of reclaimable memory pages according to an update time of a memory address corresponding to the reclaimable memory page; and calculating an idle duration for the reclaimable memory page according to the update time of the reclaimable memory page.

Solution 16. The electronic device of solution 11, wherein determining a duration threshold according to the idle durations for the plurality of reclaimable memory pages includes:

calculating an average idle duration of the application to be processed for the reclaimable memory pages according to the idle durations for the reclaimable memory pages, and taking the average idle duration as a duration threshold.

Solution 17. The electronic device of solution 11, wherein determining a duration threshold according to the idle durations for the plurality of reclaimable memory pages includes:

acquiring a reclaiming number of reclaimable memory pages; and selecting the Kth-largest idle duration from the idle durations for the plurality of reclaimable memory pages according to the reclaiming number, and taking the Kth-largest idle duration as a duration threshold, the number of reclaimable memory pages each having an idle duration greater than the Kth-largest idle duration being the reclaiming number, K being a natural number not greater than the reclaiming number.

Solution 18. The electronic device of solution 17, wherein acquiring a reclaiming number of reclaimable memory pages includes:

acquiring correspondences between re-starting durations and reclaiming proportions corresponding to the application to be processed, the re-starting duration being a duration for restarting the application to be processed after the reclaiming proportion of the reclaimable memory pages occupied by the application to be processed are reclaimed;

determining a reclaiming proportion of reclaimable memory pages according to the correspondences between reclaiming proportions and re-starting durations; and determining a reclaiming number according to the reclaiming proportion and the total number of the reclaimable memory pages.

Solution 19. The electronic device of solution 11, wherein the acquiring a plurality of reclaimable memory pages occupied by an application to be processed includes:

traversing a plurality of memory-mapped files of the application to be processed;

querying, in the plurality of memory-mapped files, all memory pages occupied by the application to be processed; and eliminating a memory page carrying an occupation mark from all the memory pages to acquire reclaimable memory pages from memory pages other than the eliminated memory page.

Solution 20. The electronic device of solution 11, wherein the processor is further configured to:

before acquiring reclaimable memory pages occupied by an application to be processed, detect whether a foreground application depends on the application to be processed;

if a foreground application depends on the application to be processed, adjusting the priority of the application to be processed to match the foreground application; and if a foreground application does not depend on the application to be processed, perform the operation of acquiring reclaimable memory pages occupied by an application to be processed.

Solution 21. A non-transitory computer-readable storage medium having a computer program stored thereon that when executed by a processor, causes the processor to implement a method, the method including:

acquiring a plurality of reclaimable memory pages occupied by an application to be processed;

acquiring an idle duration of the application to be processed for each reclaimable memory page;

determining a duration threshold according to the idle durations for the reclaimable memory pages; and reclaiming at least one memory page, for which the idle duration exceeds the duration threshold, of the plurality of reclaimable memory pages.

Solution 22. A device for processing a memory, including:

a memory page acquisition module, configured to acquire reclaimable memory pages occupied by an application to be processed;

a duration determination module, configured to acquire an idle duration of the application to be processed for each reclaimable memory page, and determine a duration threshold according to the idle durations for the reclaimable memory pages; and a memory reclaiming module, configured to select from the reclaimable memory pages a memory page for which the idle duration exceeds the duration threshold and reclaim the memory page.

In an embodiment, as illustrated in FIG. 1, an internal structure diagram of an electronic device is provided. The electronic device includes a processor, a memory and a display screen, connected through a system bus. The processor is configured to provide computing and control capabilities for supporting the operation of the entire electronic device. The memory is configured to store data, programs, and/or instruction codes or the like, the memory stores at least one computer program, and the computer program may be executed by the processor to implement a method for processing a memory provided in the embodiments of the disclosure and applied to an electronic device. The memory may include non-volatile storage media such as a magnetic disk, an optical disc and a Read-Only Memory (ROM), or a Random Access Memory (RAM) or the like. For example, in an embodiment, the memory includes a non-volatile storage medium and an internal memory. The non-volatile storage medium stores an operating system, a database and a computer program. The database stores associated data for implementing a method for processing a memory provided in various embodiments, may store, for example, information such as the name of each application and a memory page allocated to each application. The computer program may be executed by the processor to implement a method for processing a memory provided in various embodiments of the disclosure. The internal memory provides a cache operation environment for the operating system, the database and the computer program in the non-volatile storage medium. The display screen may be a touch screen such as a capacitive screen or an electronic screen, which is configured to display interface display information of a foreground application and may also be configured to detect a touch operation acting on the display screen to generate a corresponding instruction such as an instruction for switching foreground and background applications.

A person skilled in the art may understand that the structure illustrated in FIG. 1 is only a partial structure block diagram associated with the solution of the disclosure, and is not limitative to the electronic device to which the solution of the disclosure is applied. Specifically, the electronic device may include parts more or fewer than those illustrated in the figure, or combine some parts, or have different part arrangements. For example, the electronic device further includes a network interface connected through a system bus, and the network interface may be an Ethernet card or a wireless network card for communicating with an external electronic device, and communicating, for example, with a server.

Figure 2:
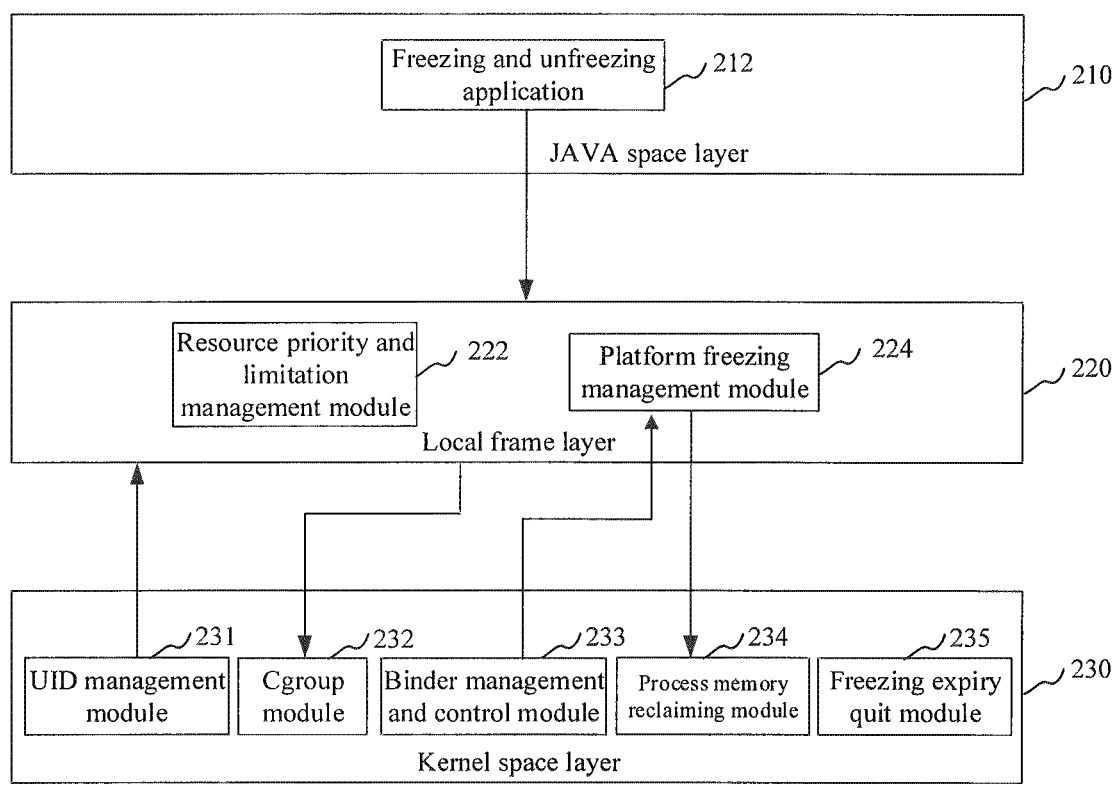
FIG. 2 is a partial frame diagram of a system in an electronic device in accordance to an embodiment.

In an embodiment, as illustrated in FIG. 2, a partial architecture diagram of an electronic device is provided. An architecture system of the electronic device includes a JAVA space layer 210, a local frame layer 220 and a kernel space layer 230. The JAVA space layer 210 may include a freezing and unfreezing application 212. The electronic device may implement a freezing policy for each application through the freezing and unfreezing application 212 to perform a freezing operation on related applications power-consuming in the background. The local frame layer 220 includes a resource priority and limitation management module 222 and a platform freezing management module 224. The electronic device may maintain different applications in organizations of different priorities and different resources in real time through the resource priority and limitation management module 222, and adjust the resource category of application programs according to upper demands so as to achieve the effects of optimizing the performance and reducing the power consumption. The electronic device may allocate tasks that can be frozen in the background to different preset corresponding freezing layers according to the entry duration of freezing time through the platform freezing management module 224. Alternatively, there may be three freezing layers, namely a CPU restriction sleep mode, a CPU freezing sleep mode, and a process deep freezing mode. The CPU restriction sleep mode refers to restricting CPU resources occupied by related processes, so that the related processes occupy fewer CPU resources, idle CPU resources are inclined to other unfrozen processes, occupation of the CPU resources is restricted, and occupation of the processes for network resources and Input/Output (I/O) interface resources are also correspondingly restricted. The CPU freezing sleep mode refers to: prohibiting related processes from using a CPU, and retaining occupation of a memory, wherein when the CPU resources are prohibited, the corresponding network resources and I/O interface resources are also be prohibited. The process deep freezing mode refers to further reclaiming memory resources occupied by related processes besides prohibiting CPU resources, wherein the reclaimed memory may be available for other processes. The kernel space layer 230 includes a User Identifier (UID) management module 231, a Cgroup module 232, a Binder management and control module 233, a process memory reclaiming module 234, and a freezing expiry quit module 235. The UID management module 231 is configured to manage or freeze resources of a third-party application based on a UID of an application. Compared with process management and control based on a Process Identifier (PID), it is more convenient to uniformly manage application resources of a user through the UID. The Cgroup module 232 is configured to provide a set of perfect Central Processing Unit (CPU), CPUSET, memory, I/O and Net-related resource limitation mechanism. The Binder management and control module 233 is configured to control the priority of a background binder communication. An interface module of the local frame layer 220 includes a binder interface developed to an upper layer, and a frame or application of the upper layer sends a resource limitation or freezing instruction to the resource priority and limitation management module 222 and the platform freezing management module 224 through the provided binder interface. The process memory reclaiming module 234 is configured to implement the process deep freezing mode, so that when a certain third-party application is in a frozen state, a process file area is mainly released, thereby achieving the effect of saving a memory and increasing the next starting speed of the application. The freezing expiry quit module 235 is configured to solve an abnormality generated in a freezing expiry scene. Through the above architecture, the method for processing a memory in various embodiments of the disclosure may be implemented.

Figure 3:
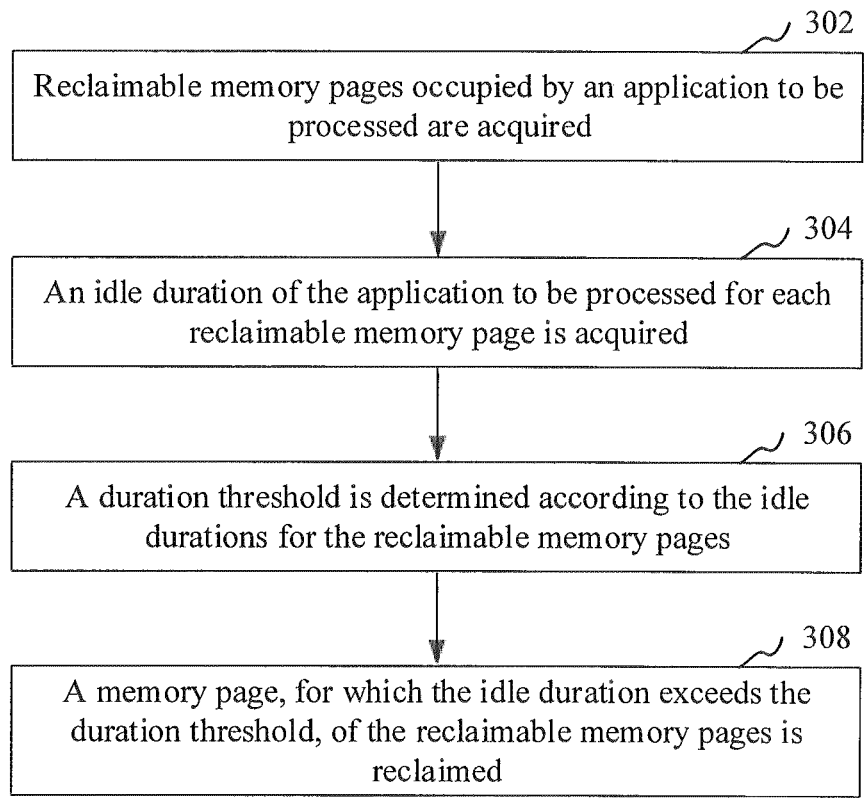
FIG. 3 is a flowchart of a method for processing a memory in an embodiment.

In an embodiment, as illustrated in FIG. 3, a method for processing a memory is provided. The present embodiment describes an example that the method is applied to the electronic device as illustrated in FIG. 1. The method includes the operations as follows.

In block 302, reclaimable memory pages occupied by an application to be processed are acquired.

The application to be processed represents an application of which the occupied memory needs to be reclaimed. Usually, the application to be processed is a background application. The background application is an application operating in the background, and correspondingly, an application operating in the foreground is a foreground application. The operation of an application (APP) is usually embodied by the operation of multiple associated processes. The process is an operation activity of a program in a computer about a certain data set, is a basic unit of a system for resource allocation and scheduling, and is the basis of an operating system structure. A process involved in the operation of the foreground application is a foreground process, and a process involved in the operation of the background application is a background process.

The application in an operating state needs to occupy a memory space to store data during operation. Memory spaces occupied by different applications in different operating states are not necessarily the same. A memory page is a memory management unit of the operating system, and unit memory sizes occupied by memory pages set by different electronic devices are not necessarily the same. For example, the memory space in the electronic device is divided into 100,000 memory pages, memory pages occupied by the application to be processed are the memory page 100 to the memory page 200, and the memory page 130 to the memory page 200 therein are reclaimable memory pages.

In an embodiment, the electronic device may pre-record all memory pages occupied by the application to be processed during operation, and reclaimable memory pages are acquired from all the memory pages. The reclaimable memory pages represent memory pages which are reclaimable and do not affect or slightly affect the operation of the application to be processed or other applications.

In an embodiment, the electronic device may record which memory pages are reclaimable memory pages and which memory pages are non-reclaimable memory pages among all the memory pages, and may acquire reclaimable memory pages occupied by the application to be processed according to record information.

In block 304, an idle duration of the application to be processed for each reclaimable memory page is acquired.

Since the data stored in the memory page is not always used by the application, the idle duration of the memory page represents a duration that the data stored in the memory page is in a non-used state after being used recently after the system allocates a memory to the application to be processed. The electronic device updates the idle duration of each memory page in real time according to the data using situation of each memory page, and when it is prepared to reclaim the memory page occupied by the application to be processed, the idle duration of each reclaimable memory page recently recorded may be acquired.

In an embodiment, under the situation of recently initiating allocation, reclaiming, release and the like of the memory page, or under the condition of querying the using condition of a cache in the processor, it is determined that data in the memory page correspondingly involved is used, and the time of recently using the data in the memory page for the system under the corresponding situation is generated, the difference between the current time and the recent time being the idle duration of the corresponding memory page.

In an embodiment, the electronic device may create a corresponding timestamp for each memory page, and the timestamp records the recent using time of the data in the corresponding memory page. In the operating system, every time the allocation, reclaiming, release and the like of the memory page are initiated, the activity of the corresponding memory page may be updated, and the update time is recorded in the timestamp. Or, when the system checks the using condition of the cache of the processor regularly, it may be determined that data in the current cache is currently used data, a timestamp of the involved memory page is updated, and the update time is recorded in the timestamp. Alternatively, the previous update time may be replaced with the update time recently recorded, so as to reduce the resource occupation of the update time.

In block 306, a duration threshold is determined according to the idle durations for the reclaimable memory pages.

The duration threshold represents a critical value used to determine whether to reclaim the reclaimable memory page. The duration threshold may be a fixed value, or a duration threshold determined according to the idle duration of each reclaimable memory page. If the idle durations are different, the determined duration thresholds are not necessarily the same.

In an embodiment, the duration threshold may be a weighted average value of the idle durations of all reclaimable memory pages, or an idle duration may be selected from the idle durations of all the reclaimable memory pages, and the selected idle duration is taken as a duration threshold. For example, an idle duration approximate to a median or at a certain position may be selected from the idle durations of all the reclaimable memory pages, and the selected idle duration is taken as a duration threshold.

In block 308, a memory page for which the idle duration exceeds the duration threshold is selected from the reclaimable memory pages to be reclaimed.

The electronic device may select a memory page for which the idle duration exceeds the duration threshold from the reclaimable memory pages occupied by the application to be processed according to the determined duration threshold for reclaiming, so as to release the reclaimable memory page corresponding to the duration threshold to be used by the foreground application or other applications, thereby improving the comprehensive processing efficiency of the system. Alternatively, the electronic device may reclaim the memory page from the reclaimable memory pages through the above-mentioned process memory reclaiming module 234 according to the duration threshold, and release a memory that has been unused for a long time, so that the memory using efficiency is improved, and after the memory page is reclaimed, the influence on the application to be processed is slight.

For example, there are 100 reclaimable memory pages, the corresponding idle durations are between 5 s to 15 min respectively, when a duration threshold determined according to the idle duration is 5 min, memory pages of which the idle duration exceeds 5 min may be reclaimed from the 100 reclaimable memory pages, and the reclaimed memory pages are released, so that the idle memory pages of the electronic device are correspondingly increased, and may be used by the foreground application or other background applications.

In the above-mentioned method for processing a memory, reclaimable memory pages occupied by an application to be processed and an idle duration thereof are acquired, a duration threshold is determined according to the idle duration, and a memory page for which the idle duration exceeds the duration threshold is reclaimed. Since the reclaimed object is a reclaimable memory page and not all the reclaimable memory pages are necessarily reclaimed, a memory page of which the idle duration exceeds a corresponding duration threshold is selected to be reclaimed according to the idle duration of each reclaimable memory page, thus reducing the operation influence on the application to be processed. Moreover, the reclaimed memory page may be released and used by other applications, thereby ensuring that the adverse impact on each application is slight when the entire system memory is increased, improving the memory using efficiency, and maintaining the balance between the reclaiming and operation of the memory of the application to be processed. In other words, the operation efficiency of a foreground application can be improved and the influence on the operation of a memory-reclaimed application can be reduced.

In an embodiment, block 304 includes: acquiring update time recorded by a timestamp of each reclaimable memory page, and calculating an idle duration for the reclaimable memory page according to the update time.

The electronic device may create a timestamp for each memory page through the above-mentioned resource priority and limitation management module 222, the timestamp is used to record the corresponding update time, and the update time represents the recent using time of the corresponding memory page. When it is detected that the memory in each memory page is used, the update time recorded by the timestamp may be updated.

Under the situation of recently initiating allocation, reclaiming, release and the like of the memory page, or under the condition of querying the using condition of a cache in the processor, it is determined that data in the memory page correspondingly involved is used, and the system time under the corresponding situation is generated as the update time. When a memory reclaiming mechanism starts to be executed, the idle duration of the corresponding memory page may be calculated according to the update time recorded by the timestamp and the current system time. The difference between the current time and the recent time is the idle duration of the corresponding memory page.

The update time of each reclaimable memory page is recorded in a manner of creating a timestamp through software, and the idle duration is determined according to the update time, so that different processors may be effectively compatible, and the universality of memory reclaiming is improved.

In an embodiment, block 304 includes: acquiring update time of each reclaimable memory page recorded through an LRU management unit, and calculating an idle duration for the reclaimable memory page according to the update time.

A corresponding LRU management unit is disposed in a memory management or cache unit in the processor, and configured to make statistics on the recently used memories. The LRU management unit may record each memory address and update time of the memory address, and when the memory corresponding to a certain address is used, the processor puts the corresponding memory address and update time into the LRU management unit for saving. When a memory reclaiming mechanism starts to be executed, a memory page corresponding to each memory address may be known according to correspondences between the memory address and the memory page, so that the update time of the corresponding memory page may be read from the LRU management unit. Under the situation of recently initiating allocation, reclaiming, release and the like of the memory page, or under the condition of querying the using condition of a cache in the processor, it is determined that data in the memory page correspondingly involved is used, and the system time under the corresponding situation is generated as the update time.

When the LRU management unit expires, interruption information may be generated and notified to the operating system, and the operating system may empty data therein after reading the data of the LRU management unit, so that the LRU management unit may restart working to store information such as each memory address and the corresponding update information.

In the present embodiment, by creating an LRU management unit, the using condition of each memory may be accurately tracked, thereby improving the detection accuracy of the update time of the memory page, and also improving the convenience of memory reclaiming.

In an embodiment, block 306 includes calculating an average idle duration of the application to be processed for the reclaimable memory pages according to the idle durations for the reclaimable memory pages, and taking the average idle duration as a duration threshold.

The average idle duration may be an average value of occupation durations of each memory page in reclaimable memory pages occupied by the application to be processed. The electronic device may call the corresponding calculation unit to perform calculation according to the counted occupation duration of each memory page, so as to calculate the average idle duration and take the average idle duration as a duration threshold.

By taking the average idle duration as a duration threshold, the calculation efficiency of the duration threshold may be improved, and the calculation is simple, so as to correspondingly improve the efficiency of memory reclaiming.

In an embodiment, the operation of determining a duration threshold according to the idle durations for the reclaimable memory pages includes acquiring a reclaiming number of the reclaimable memory pages; selecting the $K^{th}$-largest idle duration from the idle durations for the reclaimable memory pages according to the reclaiming number, and taking the selected idle duration as a duration threshold, the number of idle durations greater than the $K^{th}$-largest idle duration being the reclaiming number.

The reclaiming number is a reclaiming number of memory pages, the number being a positive integer. The reclaiming number may be determined according to one or more of the priority of the application to be processed, the total number of occupied reclaimable memory pages, the idle duration or the like. Alternatively, the reclaiming number may be negatively correlated to the priority of the corresponding application, and positively correlated to the total number of the reclaimable memory pages. When the priority of the corresponding application is lower, the reclaiming number is larger accordingly; and when the total number of the reclaimable memory pages is larger, the corresponding reclaiming number is also larger.

The electronic device may sort the idle durations of each reclaimable memory page in an ascending order, and select the $K^{th}$-largest idle duration as the duration threshold. The number of idle durations greater than the $K^{th}$-largest idle duration is the reclaiming number. It may be understood that K is a natural number not greater than the reclaiming number. For example, the total number of the reclaimable memory pages is 100, when the determined reclaiming number is 50, K=51, the $51^{st}$-largest idle duration may be selected from the idle durations of the 100 reclaimable memory pages as the duration threshold, and 50 reclaimable memory pages of which the idle durations exceed the $51^{st}$-largest idle duration are selected to be reclaimed.

The $K^{th}$-largest idle duration is selected as the duration threshold, so that the reclaiming flexibility of reclaimable memory pages is improved.

In an embodiment, the operation of acquiring a reclaiming number of reclaimable memory pages includes acquiring a reclaiming proportion corresponding to the application to be processed; and determining the reclaiming number according to the reclaimable memory pages and the reclaiming proportion.

The reclaiming proportion represents a proportion of reclaiming of memories to be reclaimed, and the reclaiming proportion is used to guide the magnitude of reclaiming reclaimable memories. For example, the reclaimed portion is 50%, which represents that 50% of occupied memories may be reclaimed. The electronic device presets reclaiming proportions corresponding to different applications. Alternatively, correspondences between different reclaiming proportions and application identifiers may be established, and the electronic device may acquire the corresponding reclaiming proportion according to the corresponding relationship between the application identifier of the application to be processed and the reclaiming proportion. The application identifier is used to uniquely identify an application, and may be constituted by one or more of a preset digit of number, letter or other characters.

In an embodiment, the reclaiming proportion may be determined according to the re-starting duration of the application to be processed, and the electronic device may pre-test reclaiming of reclaimable memory pages occupied by the application to be processed according to different proportions. The starting duration needed when the application to be processed is re-started after the memory page corresponding to the proportion is reclaimed is detected, the starting duration being the re-starting duration. A relatively appropriate proportion is determined according to the re-starting duration corresponding to different proportions, and the determined proportion is taken as the reclaiming proportion corresponding to the application to be processed.

The reclaiming number may be a product between the total number of the reclaimable memory pages and the determined reclaiming proportion. When the product is not an integer, an integer approximate to the product may be selected. For example, a most approximate integer may be determined as the reclaiming number in a round-off manner, or a corresponding integer may be determined as the reclaiming number according to methods such as a truncation method or a carry method.

The reclaiming number is determined in the round-off manner herein. For example, when there are 100 reclaimable memory pages, if the reclaiming proportion is 30.5% and an obtained product is 30.5, 31 pages may be reclaimed from the 100 reclaimable memory pages, and if the reclaiming proportion is 21.2%, 21 pages may be reclaimed.

By acquiring the reclaiming proportion corresponding to the application to be processed and then determining the reclaiming number according to the reclaiming proportion, the determination flexibility of the reclaiming number may be further improved.

In an embodiment, the operation of acquiring the reclaiming proportion corresponding to the application to be processed includes acquiring an application type of the application to be processed; and acquiring a reclaiming proportion calculated according to a reclaiming model corresponding to the application type.

The application type is the type set according to the operation influence on the application to be processed after memory reclaiming. The application type includes an unrelated type, a linear type and a non-linear type. The unrelated type represents no remarkable influence on the corresponding application regardless of the reclaiming number after reclaimable memories of the application to be processed are reclaimed. The linear type represents that with the increase of the reclaiming proportion of the reclaimable memories, the re-starting duration of the corresponding application is also increased, wherein the re-starting duration and the reclaiming proportion have a relationship of linear or approximately linear increase. The non-linear type represents other types neither the unrelated type nor the linear type. The no remarkable influence represents that an greater than proportion of re-starting durations corresponding to different reclaiming proportions relative to a normal starting duration is smaller than a preset proportion range. The approximately linear increase represents that an error between a re-starting duration fitted by different reclaiming proportions according to the corresponding approximate slope and a re-starting duration under the corresponding reclaiming proportion does not exceed an error within a preset range.

The electronic device sets, for different applications, an application type corresponding to this application according to the influence on the application after the memories are reclaimed according to different reclaiming proportions. The electronic device further sets a corresponding reclaiming model for each application type, and calculates, according to the reclaiming model, the size of the re-starting duration corresponding to the application type after reclaimable memory pages are reclaimed according to different proportions.

An optimal reclaiming proportion is determined according to different reclaiming proportions and the corresponding re-starting durations, so that under the condition of keeping the re-starting duration not greatly increased relative to the normal starting duration, the reclaiming proportion is maximum, and the optimal reclaiming proportion is acquired.

In an embodiment, when the application type of the application to be processed is the unrelated type, the reclaiming proportion calculated through the reclaiming model may be 100%, that is, the reclaimable memory page may be reclaimed by 100%. When the application type of the application to be processed is the non-linear type, an appropriate proportion may be selected as the reclaiming proportion, so that the cost performance between the number of the reclaimed memory pages and the re-starting duration of the corresponding application is highest. For example, a proportion corresponding to the re-starting duration which is a preset duration threshold may be selected, and the proportion is taken as the reclaiming proportion. Or, a proportion corresponding to the re-starting duration which is a preset multiple of a normal starting duration may be selected, and the proportion is taken as the reclaiming proportion. The preset duration threshold or the preset multiple may be an appropriate value set according to an empirical value. For example, the duration threshold may be 2 s or 3 s, and the preset multiple may be 1.5 or 2.

When the application type of the application to be processed is the linear type, the corresponding reclaiming proportion may be determined according to different slopes, wherein the slope represents the magnitude of inclination of a curve formed by the corresponding re-starting duration under different reclaiming proportions relative to the reclaiming proportion. As the slope is larger, the determined reclaiming proportion is relatively smaller, so as to maintain the balance between the reclaiming and operation of the memory of the application to be processed.

Figure 4A:
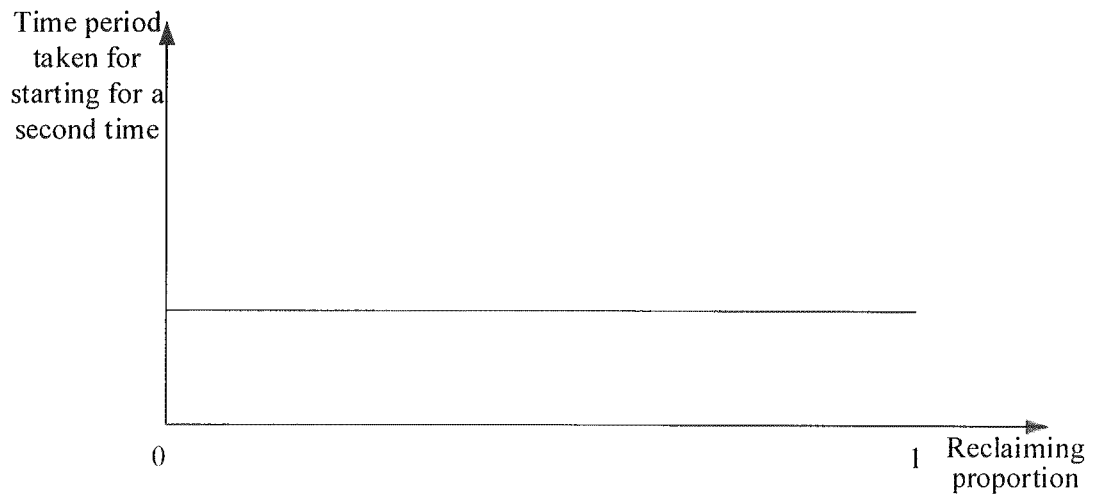
FIG. 4A is a reclaiming proportion curve diagram of unrelated applications in an embodiment.
Figure 4B:
FIG. 4B is a reclaiming proportion curve diagram of linear applications in accordance to an embodiment.
Figure 4C:
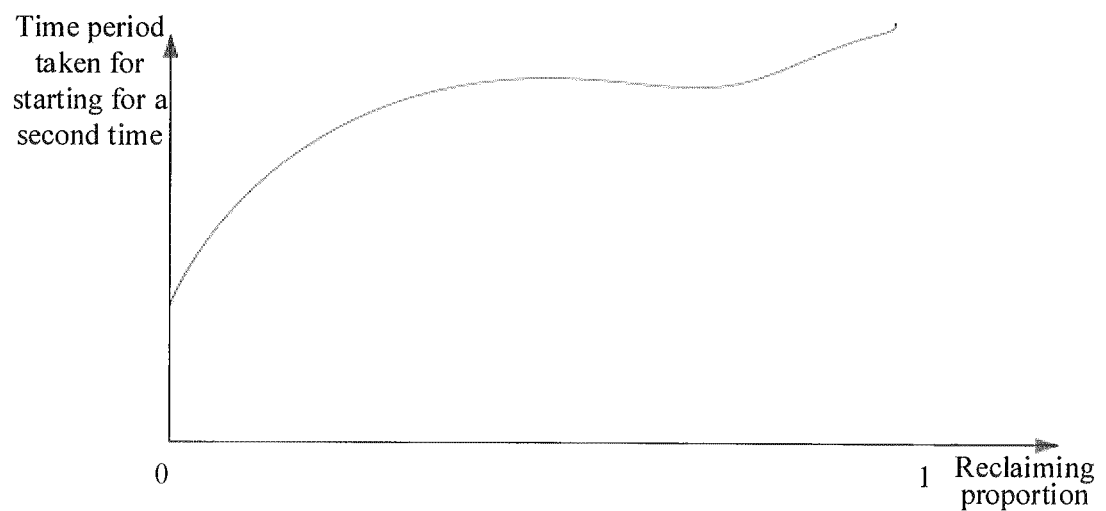
FIG. 4C is a reclaiming proportion curve diagram of non-linear applications in accordance to an embodiment.

For example, as illustrated in FIG. 4A, FIG. 4B to FIG. 4C, reclaiming proportion curves of unrelated, linear and non-linear applications in an embodiment are provided respectively. The horizontal coordinate in the reclaiming proportion curve represents a reclaiming proportion, and the vertical coordinate represents a re-starting duration under the corresponding reclaiming proportion. The reclaiming proportion curve of the unrelated applications reflects that the corresponding re-starting duration does not change or slightly changes after reclaimable memory pages of the corresponding application are reclaimed according to different reclaiming proportions. The corresponding slope of the reclaiming proportion curve of the linear applications does not change or slightly changes under different reclaiming proportions, but the reclaiming proportion curve of the non-linear applications is partially large in slope and partially small in slope. For non-linear applications, a reclaiming proportion corresponding to the minimum slope may be selected as the reclaiming proportion of reclaimable memory pages.

Figure 5:
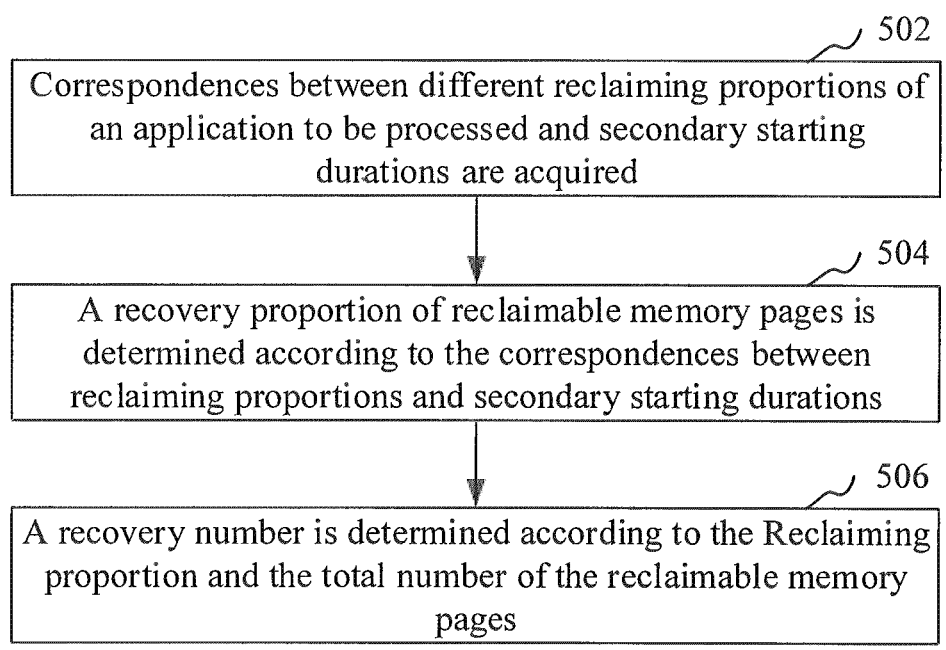
FIG. 5 is a flowchart of a method for processing a memory in accordance to another embodiment.

In an embodiment, as illustrated in FIG. 5, the operation of acquiring a reclaiming number of reclaimable memory pages includes the operations as follows.

In block 502, correspondences between different reclaiming proportions of the application to be processed and re-starting durations is acquired.

The reclaiming proportion represents a proportion of reclaiming of memories to be reclaimed, and the reclaiming proportion is used to guide the magnitude of reclaiming reclaimable memories. For example, the reclaimed portion is 50%, which represents that 50% of occupied memories may be reclaimed. The re-starting duration refers to a duration for restarting the application to be processed after the reclaiming proportion of the reclaimable memory pages occupied by the application to be processed are reclaimed.

The electronic device may set correspondences between a corresponding reclaiming proportion and a re-starting duration for each application. The corresponding relationship represents a corresponding re-starting duration after reclaimable memories in different proportions are reclaimed from memories occupied by the application. Alternatively, the corresponding relationship may be a comparison table between a corresponding reclaiming proportion and a re-starting duration, or a reclaiming proportion curve. The curve is a corresponding re-starting duration under different reclaiming proportions.

In block 504, a reclaiming proportion of reclaimable memory pages is determined according to the correspondences between reclaiming proportions and re-starting durations.

In block 506, a reclaiming number is determined according to the reclaiming proportion and the total number of the reclaimable memory pages.

Alternatively, the electronic device may set a corresponding starting duration threshold, and when the second starting duration reaches the starting duration threshold, the corresponding proportion is determined as the reclaiming proportion of reclaimable memory pages. The starting duration threshold may be a preset empirical value, and further, starting duration thresholds corresponding to different applications may not be necessarily the same. For example, the corresponding starting duration threshold may be determined according to a normal starting duration of the corresponding application, and a duration which is 1.5 or 2 times the normal starting duration is taken as the starting duration threshold.

An appropriate proportion is selected according to the corresponding relationship with reference to different re-starting durations and taken as the reclaiming proportion of reclaimable memory pages occupied by the application, thus maintaining the balance between the reclaiming and operation of the memory of the application to be processed.

In an embodiment, block 302 includes querying all memory pages of a memory occupied by the application to be processed; and acquiring reclaimable memory pages from all the memory pages.

Alternatively, the electronic device may record memory pages of memories occupied by different applications in real time, and further record, in real time, whether each occupied memory page is reclaimable. For example, when data in a certain memory page is currently used by other applications or the application to be processed, it is determined that the memory page is a non-reclaimable memory page; and when it is recorded that data in the occupied memory page is not used by an application or the duration of this state exceeds a preset duration, it is determined that the memory page is a reclaimable memory page.

All memory pages occupied by the application to be processed may be queried from the pre-recorded information, it is judged, according to the using state of each recorded memory page, whether the memory page is a reclaimable memory page, and then all reclaimable memory pages are acquired.

In an embodiment, the operation of querying all memory pages of a memory occupied by the application to be processed includes traversing memory-mapped files of the application to be processed; and querying, in the memory-mapped files, all memory pages occupied by the application to be processed.

The memory-mapped files are mapping from a file to a memory. The electronic device establishes corresponding memory-mapped files for the application to be processed, the memory-mapped files are provided with memory pages occupied by the corresponding application, the memory-mapped files corresponding to the application to be processed are traversed, and the memory pages occupied by the application to be processed are read from each traversed memory-mapped file, so that all memory pages occupied by the application to be processed may be acquired, and the query efficiency and query comprehensiveness of the memory pages occupied by the application to be processed are improved.

In an embodiment, the operation of acquiring reclaimable memory pages from all the memory pages includes eliminating a memory page carrying an occupation mark from all the memory pages; and acquiring reclaimable memory pages from memory pages other than the eliminated memory page.

For all the queried memory pages occupied by the application to be processed, the electronic device may detect whether each queried memory page carries an occupation mark or whether it is occupied by multiple applications. The occupation mark represents that data stored in the corresponding memory page is currently used by the application to be processed, or data therein is necessary when the application to be processed keeps normal operation. After the data is deleted, either the application to be processed cannot normally operate or it is necessary to repeatedly occupy a new memory page to store corresponding data. The electronic device may set occupation marks for memory pages storing these types of detected data, so as to indicate that the corresponding memory pages cannot be reclaimed.

The data stored in the memory page occupied by the application to be processed may also be used by other applications. That is, multiple applications use the data in the memory page. Occupation marks may also be set for this type of memory pages, so that the electronic device eliminates it likewise, so as to indicate that this type of memory pages will not be reclaimed.

The memory pages remained relative to the eliminated memory pages are reclaimable memory pages, and the electronic device may reclaim a memory from the memory pages.

In an embodiment, the electronic device may call the resource priority and limitation management module 222 as illustrated in FIG. 2 to traverse memory-mapped files of the application to be processed; in the memory-mapped files, all memory pages occupied by the application to be processed are queried, the resource priority and limitation management module 222 detects whether each memory page is a reclaimable memory page, corresponding occupation marks are set for non-reclaimable memory pages, it is recorded whether each memory page is also occupied by multiple applications, a memory page carrying an occupation mark and/or occupied by multiple applications is eliminated from all the queried memory pages, and reclaimable memory pages are acquired from memory pages other than the eliminated memory page.

Figure 6:
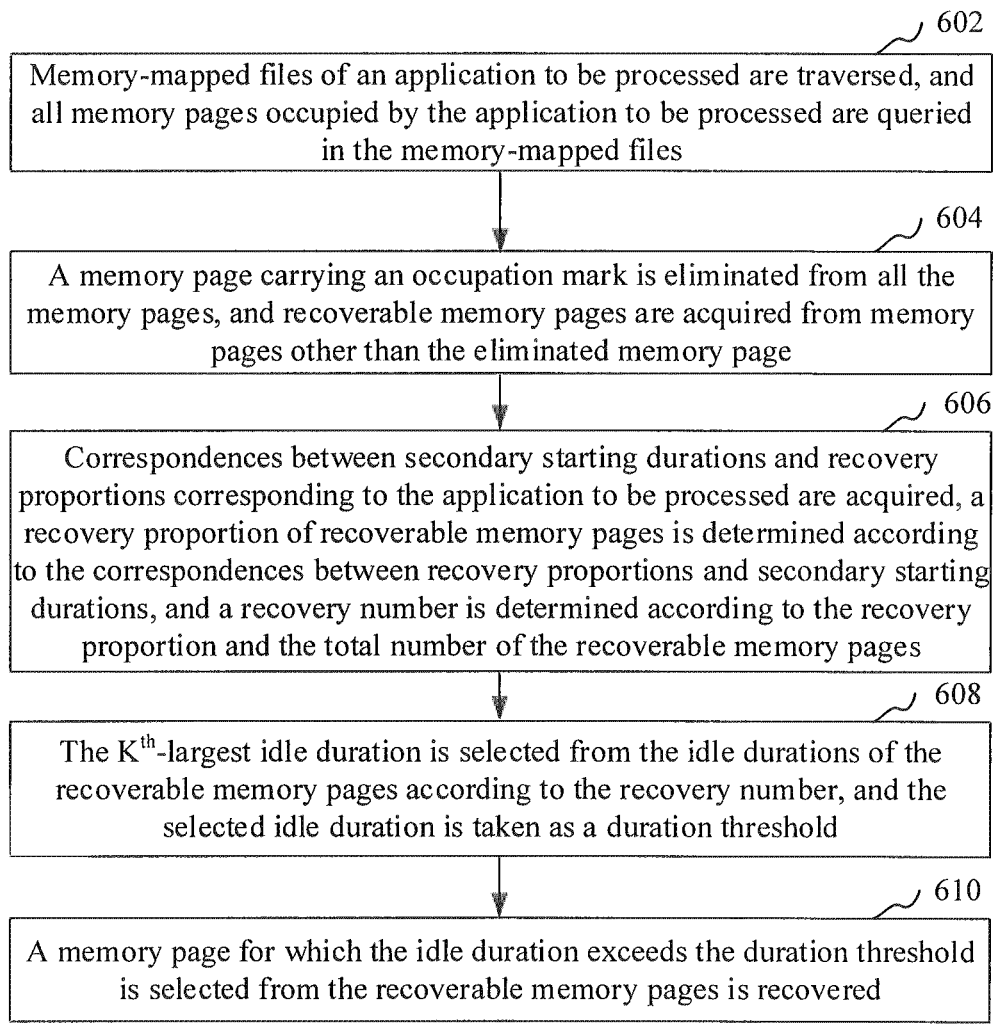
FIG. 6 is a flowchart of another method for processing a memory in accordance to another embodiment.

In an embodiment, as illustrated in FIG. 6, another method for processing a memory is provided. The method includes the operations as follows.

In block 602, memory-mapped files of an application to be processed are traversed, and all memory pages occupied by the application to be processed are queried in the memory-mapped files.

In an embodiment, the electronic device may trigger a memory reclaiming mechanism when it is detected that the memory using rate of the system exceeds a preset proportion or a memory reclaiming instruction triggered by a user operation is received, and determine a memory reclaiming application from all operating applications, the determined application being the application to be processed.

In an embodiment, after detecting that a certain application is switched from the foreground to the background and setting the application to a process deep freezing mode through the platform freezing management module 224, the electronic device may trigger a memory reclaiming mechanism of the application.

The electronic device may traverse memory-mapped files of the application to be processed through the above-mentioned resource priority and limitation management module 222, and query a memory page occupied by the application to be processed from each traversed memory-mapped file, so that all memory pages occupied by the application to be processed can be queried.

In block 604, a memory page carrying an occupation mark is eliminated from all the memory pages, and reclaimable memory pages are acquired from memory pages other than the eliminated memory page.

Secondary traversal may be performed on each queried memory page, the secondary traversal is used to detect whether each queried memory page is a reclaimable memory page, when a memory page carrying an occupation mark is detected, it is determined that the memory page is a non-reclaimable memory page, the memory page is eliminated, the memory pages obtained after the secondary traversal are reclaimable memory pages, and the electronic device may select a memory page to be reclaimed from all the reclaimable memory pages. The secondary traversal may improve the detection comprehensiveness of reclaimable memory pages.

In block 606, correspondences between re-starting durations and reclaiming proportions corresponding to the application to be processed is acquired, a reclaiming proportion of reclaimable memory pages is determined according to the correspondences between reclaiming proportions and re-starting durations, and a reclaiming number is determined according to the reclaiming proportion and the total number of the reclaimable memory pages.

The re-starting duration refers to a duration for restarting the application to be processed after the reclaiming proportion of the reclaimable memory pages occupied by the application to be processed are reclaimed. The corresponding relationship may be a comparison table between a corresponding reclaiming proportion and a re-starting duration, or a reclaiming proportion curve. The curve is a corresponding re-starting duration under different reclaiming proportions, and the curve may be the curve as illustrated in FIG. 4A to FIG. 4C.

The electronic device may determine a relatively appropriate reclaiming proportion according to the curve in accordance with different application types. The reclaiming proportion and the total number of the reclaimable memory pages are multiplied to obtain a product, and an integer approximate to the product is taken as the reclaiming number.

In block 608, the $K^{th}$-largest idle duration is selected from the idle durations of each reclaimable memory page according to the reclaiming number, and the selected idle duration is taken as a duration threshold.

The number of reclaimable memory pages greater than the $K^{th}$-largest idle duration is the reclaiming number, and the $K^{th}$-largest idle duration is the duration threshold. Reclaiming numbers determined by different reclaiming proportions are different, and corresponding K values are different under different reclaiming numbers, that is, duration thresholds are different. For example, the total number of the reclaimable memory pages is 100, when the reclaiming proportion is 50%, the corresponding reclaiming number is 50, K=51, and the duration threshold is the $51^{st}$-largest idle duration; and when the reclaiming proportion is 30.3%, the corresponding reclaiming number is 30, K=31, and the duration threshold is the $31^{st}$-largest idle duration.

In block 610, a memory page for which the idle duration exceeds the duration threshold is selected from the reclaimable memory pages to be reclaimed.

The electronic device may reclaim the memory page from the reclaimable memory pages through the above-mentioned process memory reclaiming module 234 according to the duration threshold, and release a memory that has been unused for a long time, so that the memory using efficiency is improved, and after the memory page is reclaimed, the influence on the application to be processed is slight.

In the above-mentioned method for processing a memory, reclaimable memory pages occupied by an application to be processed and an idle duration thereof are acquired, a duration threshold is determined according to the idle duration, and a memory page for which the idle duration exceeds the duration threshold is reclaimed. Since the reclaimed object is a reclaimable memory page and not all the reclaimable memory pages are necessarily reclaimed, a memory page of which the idle duration exceeds a corresponding duration threshold is selected to be reclaimed according to the idle duration of each reclaimable memory page, thus reducing the operation influence on the application to be processed. Moreover, the reclaimed memory page may be released and used by other applications, thereby ensuring that the adverse impact on each application is slight when the entire system memory is increased, improving the memory using efficiency, and maintaining the balance between the reclaiming and operation of the memory of the application to be processed.

In an embodiment, before acquiring reclaimable memory pages occupied by an application to be processed, the method further includes detecting whether a foreground application depends on the application to be processed; if a foreground application depends on the application to be processed, adjusting the priority of the application to be processed to match the foreground application; and if a foreground application does not depend on the application to be processed, performing the operation of acquiring reclaimable memory pages occupied by an application to be processed.

In an embodiment, when the foreground application ends the dependency on the application to be processed, the operation of acquiring reclaimable memory pages occupied by an application to be processed is performed.

The dependency represents a relationship that an application can smoothly implement normal operation of another application by using data of another or more applications. Two applications having a dependency relationship are a depended application and a depending application respectively, and the electronic device determines the detected application to be processed which is depended by a foreground application and operates in the background as a background application depended by the foreground application. The electronic device may set a corresponding depended mark for the detected background application depended by the foreground application, acquire a background application with the depended mark from a background application pool, and determine the background application as the background application depended by the foreground application. The foreground application is an application operating in the foreground.

If the application to be processed is depended by the foreground application, the application to be processed may be determined as an application depended by the foreground application, and the priority of the application to be processed which is depended by the foreground application is adjusted to match the priority of the foreground application.

Alternatively, the electronic device may adjust the priority of the queried application to be processed which is depended by the foreground application, so that the adjusted priority matches the priority of the foreground application. The electronic device may set a matching relationship between the priority of different applications to be processed which are depended by the foreground application and the foreground priority. The corresponding priority of the application to be processed which is applicable to being depended by the foreground application is acquired according to the matching relationship, and the priority of the application to be processed which is depended by the foreground application is adjusted to this priority, so that the resource limitation degree of the application to be processed which is depended by the foreground application is reduced, and the limitation degree of resources available for the application to be processed which is depended by the foreground application matches the limitation degree of the foreground application.

In an embodiment, the priority matching the priority of the foreground application may be the priority which is the same as the priority of the foreground application. That is, the electronic device may adjust the priority of the application to be processed which is depended by the foreground application to the priority which is the same as the priority of the foreground application, so that the limitation degree of resources available for the application to be processed which is depended by the foreground application is the same as the limitation degree of the foreground application.

By detecting a dependency relationship on the application to be processed, the priority of the application to be processed which is depended by the foreground application is adjusted to the priority matching the foreground application. Since the priority of the foreground application is highest usually, the corresponding limitation degree of available resources is lowest, and the priority of a background process is lower, so as to prevent influence on the foreground application due to occupation of excessive resources by the background process. However, the background process has a situation of being depended by the foreground application, and the execution efficiency of the depended background process may also affect the foreground application. In the embodiments of the disclosure, by adjusting the priority of the depended application to be processed to the priority matching the foreground priority, the limitation degree of resources available for the depended application to be processed may be reduced, and the processing efficiency of the depended application to be processed is improved. The processing efficiency of the depended application to be processed is improved, so that the processing efficiency of the foreground application depending on the depended application to be processed is also improved.

In an embodiment, when socket communication, binder communication, memory share or lock waiting exists between the application to be processed and the foreground application, it is determined that a communication mechanism exists between the background process and the foreground application.

It may be detected whether a background process having a communication mechanism with the foreground application exists in any one or more of the following manners:

(1) detecting whether a background process having socket and/or binder communication with the foreground application exists;

(2) detecting whether a background process having memory share with the foreground application exists; and (3) detecting whether a background process waiting on lock resources with the foreground application exists.

The electronic device may provide a detection mechanism for detecting whether Binder communication exists between the foreground application and the background process in a Binder drive, call the detection mechanism provided in the Binder drive to detect the background process having Binder communication with the foreground application, and determine the detected background process as the background process depended by the foreground application.

In an embodiment, the electronic device may detect various lock resources, the lock resources including a thread lock, a file handle, a signal and the like. It may be detected whether lock waiting namely lock resource waiting occurs to each lock resource. When it is detected that lock waiting is generated, it may be further detected whether the waiting behavior occurs on the foreground application. If a foreground application depends on the application to be processed, all background processes waiting on the lock resource are traversed, and the detected background processes waiting on the lock resource are determined as the background process depended by the foreground application.

In an embodiment, the electronic device may provide a lock resource monitoring module and a priority adjustment module in a kernel space of the operating system, and embed the lock resource monitoring module into an original waiting interface of the kernel. The lock resource monitoring module detects whether various lock resources such as the thread lock, the file handle and the signal wait, and whether the waiting behavior occurs on the foreground application, and sends, if a foreground application depends on the application to be processed, a detected message to the priority adjustment module. The priority adjustment module traverses all background processes waiting on the lock resource, and determines these background processes as the background process depended by the foreground application. The priority adjustment module adjusts the priority of the corresponding application to be processed to the matching priority.

In an embodiment, when a synchronization mechanism exists between the background process and the foreground application, the application to be processed having the synchronization mechanism is determined as the background process depended by the foreground application.

The electronic device may also detect, by calling a futex system, whether a background process having the synchronization mechanism with the foreground application exists in a background process set, and determine the background process having the synchronization mechanism as the background process depended by the foreground application.

In concurrent programming, the access of each process to a public variable must be restricted, this restriction being referred to as synchronization. In the operating system, a synchronization mechanism of a user mode may be implemented by calling the futex system. The user mode refers to a non-privileged state. The synchronization mechanism includes a semaphore, an exclusive lock or the like. When it is detected that a background process having any one synchronization mechanism with the foreground application exists by calling the futex system, the detected background process may be determined as the background process depended by the foreground application.

By detecting a communication mechanism and/or a synchronization mechanism between the foreground application and the background process, the detected background process having the communication mechanism and/or the synchronization mechanism with the foreground application is determined as the background process depended by the foreground application, so that the detection efficiency of the application to be processed which is depended by the foreground application can be improved.

It should be understood that although various operations in the flowchart in FIG. 3, FIG. 5 and FIG. 6 are displayed in sequence according to the indication of an arrow, these operations are not necessarily performed in the sequence indicated by the arrow. Unless expressly stated herein, there is no strict sequence limitation to these operations, which may be performed in other sequences. Moreover, at least some operations in FIG. 3, FIG. 5 and FIG. 6 may include multiple sub-operations or multiple stages, these sub-operations or stages are not necessarily completed at the same moment but may be performed at different moments, and these sub-operations or stages are not necessarily performed in a sequence but may be performed in turns or alternately with at least some of other operations or sub-operations or stages of the other operations.

Figure 7:
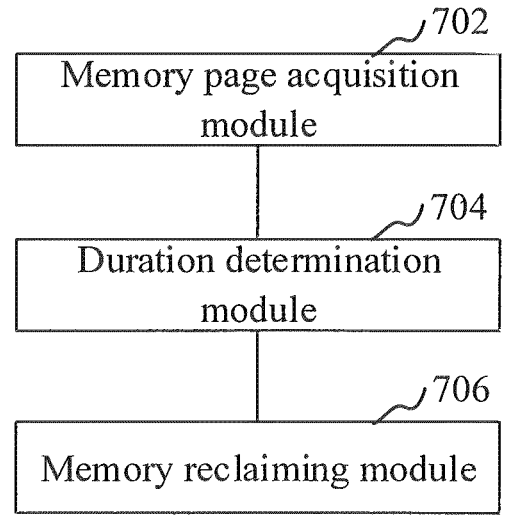
FIG. 7 is a structure block diagram of a device for processing a memory in accordance to an embodiment.

In an embodiment, as illustrated in FIG. 7, a device for processing a memory is provided. The apparatus includes a memory page acquisition module 702, a duration determination module 704 and a memory reclaiming module 706. The memory page acquisition module 702 is configured to acquire reclaimable memory pages occupied by an application to be processed. The duration determination module 704 is configured to acquire an idle duration of the application to be processed for each reclaimable memory page, and determine a duration threshold according to the idle durations for the reclaimable memory pages. The memory reclaiming module 706 is configured to select from the reclaimable memory pages a memory page for which the idle duration exceeds the duration threshold and reclaiming the memory page.

In an embodiment, the duration determination module 704 is further configured to acquire update time recorded by a timestamp of each reclaimable memory page, and calculate an idle duration for the reclaimable memory page according to the update time.

In an embodiment, the duration determination module 704 is further configured to acquire update time of each reclaimable memory page recorded through an LRU management unit, and calculate an idle duration for the reclaimable memory page according to the update time.

In an embodiment, the duration determination module 704 is further configured to calculate an average idle duration of the application to be processed for the reclaimable memory pages according to the idle durations for the reclaimable memory pages, and take the average idle duration as a duration threshold.

In an embodiment, the duration determination module 704 is further configured to acquire a reclaiming number of the reclaimable memory pages, select the Kth-largest idle duration from the idle durations for the reclaimable memory pages according to the reclaiming number, and take the selected idle duration as a duration threshold, the number of idle durations greater than the $K^{th}$-largest idle duration being the reclaiming number, K being a natural number not greater than the reclaiming number.

In an embodiment, the duration determination module 704 is further configured to: acquire correspondences between re-starting durations and reclaiming proportions corresponding to the application to be processed, the re-starting duration being a duration for restarting the application to be processed after the reclaiming proportion of the reclaimable memory pages occupied by the application to be processed are reclaimed; determine a reclaiming proportion of reclaimable memory pages according to the correspondences between reclaiming proportions and re-starting durations; and determine a reclaiming number according to the reclaiming proportion and the total number of the reclaimable memory pages.

In an embodiment, the memory page acquisition module 702 is further configured to: traverse memory-mapped files of the application to be processed; query, in the memory-mapped files, all memory pages occupied by the application to be processed; eliminate a memory page carrying an occupation mark from all the memory pages; and acquire reclaimable memory pages from memory pages other than the eliminated memory page.

Figure 8:
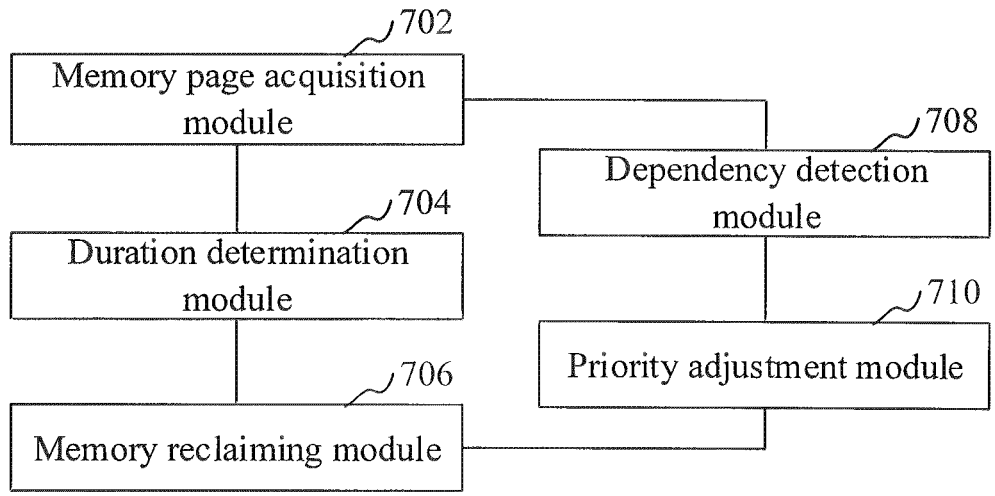
FIG. 8 is a structure block diagram of a device for processing a memory in accordance to another embodiment.

In an embodiment, as illustrated in FIG. 8, another device for processing a memory is provided. The apparatus further includes a dependency detection module 708 and a priority adjustment module 710.

The dependency detection module 708 is configured to detect whether a foreground application depends on the application to be processed.

The priority adjustment module 710 is configured to adjust, when the application to be processed is depended on the foreground application, the priority of the application to be processed to match the foreground application.

In the above-mentioned device for processing a memory, reclaimable memory pages occupied by an application to be processed and an idle duration thereof are acquired, a duration threshold is determined according to the idle duration, and a memory page for which the idle duration exceeds the duration threshold is reclaimed. Since the reclaimed object is a reclaimable memory page and not all the reclaimable memory pages are necessarily reclaimed, a memory page of which the idle duration exceeds a corresponding duration threshold is selected to be reclaimed according to the idle duration of each reclaimable memory page, thus reducing the operation influence on the application to be processed. Moreover, the reclaimed memory page may be released and used by other applications, thereby ensuring that the adverse impact on each application is slight when the entire system memory is increased, improving the memory using efficiency, and maintaining the balance between the reclaiming and operation of the memory of the application to be processed.

The division of each module in the above-mentioned device for processing a memory is only for illustration, and in other embodiments, the device for processing a memory may be divided into different modules as needed to complete all or some functions of the above-mentioned device for processing a memory.

Specific limitations about the device for processing a memory may refer to limitations to the method for processing a memory, and will not be elaborated herein. Various modules in the above-mentioned device for processing a memory may be implemented by software, hardware or a combination thereof totally or partially. Various modules may be embedded into or dependent from the processor of the electronic device in the form of hardware, and may also be stored in the memory of the electronic device in the form of software, in order that the processor calls to perform the operation corresponding to each module.

Each module in the device for processing a memory provided in the embodiments of the disclosure may be implemented in the form of a computer program. The computer program may operate on the electronic device such as a terminal or a server. A program module formed by the computer program may be stored on the memory of the electronic device. The computer program is executed by a processor to implement the operations of the method for processing a memory described in the embodiments of the disclosure.

In an embodiment, an electronic device is provided, which includes a memory, a processor and a computer program stored on the memory and runnable on the processor, the processor executing the computer program to implement the operations of the method for processing a memory provided in various embodiments.

In an embodiment, a computer-readable storage medium is also provided, which has a computer program stored thereon, the computer program being executed by a processor to implement the operations of the method for processing a memory described in various embodiments of the disclosure.

In an embodiment, a computer program product including an instruction is provided. When the computer program product operates on a computer, the computer performs the method for processing a memory described in various embodiments of the disclosure.

Figure 9:
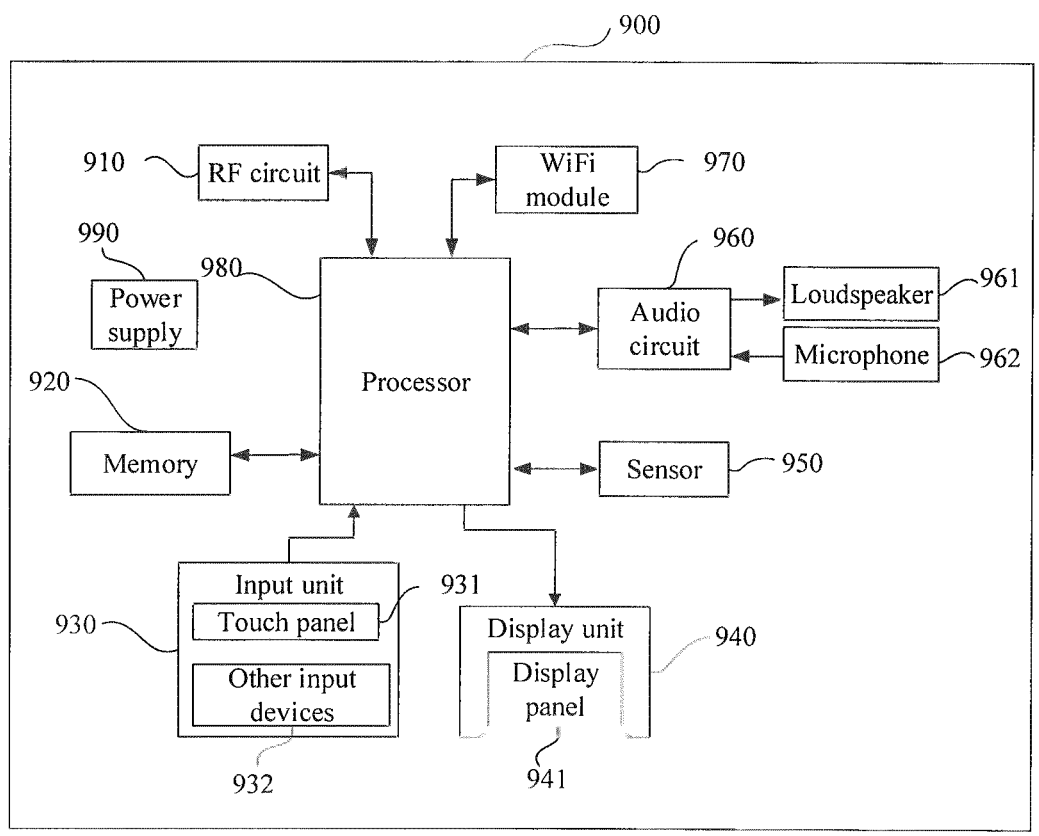
FIG. 9 is a block diagram of a partial structure of a mobile phone in accordance to an embodiment.

The embodiments of the disclosure also provide a computer device. As illustrated in FIG. 9, for convenience of description, only parts associated with the embodiments of the disclosure are shown. Specific technical details that are not disclosed refer to parts of the method in the embodiments of the present invention. The computer terminal may be any terminal device including a mobile phone, a tablet computer, a Personal Digital Assistant (PDA), a Point of Sales (POS), an on-board computer, and a wearable device. A mobile phone is taken as the computer terminal.

FIG. 9 is a block diagram of a partial structure of a mobile phone associated with a computer terminal according to an embodiment of the disclosure. Referring to FIG. 9, the mobile phone includes a Radio Frequency (RF) circuit 910, a memory 920, an input unit 930, a display unit 940, a sensor 950, an audio circuit 960, a Wireless Fidelity (WiFi) module 970, a processor 980, a power supply 990, and other parts. A person skilled in the art may understand that a mobile phone structure illustrated in FIG. 9 is not limitative to the mobile phone, and the mobile phone may include parts more or fewer than those illustrated in the figure, or combine some parts, or have different part arrangements.

The RF circuit 910 may be configured to receive and send a signal during information receiving and transmitting or during a call, may receive downlink information of a base station and then send the information to the processor 980 for processing, or may send uplink data to the base station. Usually, the RF circuit includes, but is not limited to, an antenna, at least one amplifier, a transceiver, a coupler, a Low Noise Amplifier (LNA), a duplexer, etc. In addition, the RF circuit 910 may further communicate with other devices via wireless communication and a network. The wireless communication may use any one communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 920 may be configured to store a software program and a module, and the processor 980 executes various function APPs and data processing of the mobile phone by running the software program and the module stored in the memory 920. The memory 920 may mainly include a storage program region and a storage data region, wherein the storage program region may store an operation system, an APP needed for at least one function (an application program of a sound playing function, an application program of an image playing function, etc.), etc; and the storage data region may store data (audio data, contacts, etc.) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone 900. Specifically, the input unit 930 may include a touch panel 931 and other input devices 932. The touch panel 931 also referred to as a touch screen may collect touch operations of a user thereon or nearby (such as an operation of the user on the touch panel 931 or nearby the touch panel 931 by using any suitable objects or attachments such as a finger or a stylus), and drives a corresponding connecting apparatus according to a preset program. In an embodiment, the touch panel 931 may include a touch detection apparatus and a touch controller. The touch detection apparatus detects the touch orientation of the user, detects a signal brought by the touch operation, and transmits the signal to the touch controller; and the touch controller receives touch information from the touch detection apparatus, converts it to touch coordinates, transmits the touch coordinates to the processor 980, and can receive a command sent by the processor 980 and execute the command. In addition, the touch panel 931 may be implemented by using multiple types such as resistance, capacitance, infrared rays and surface acoustic wave. The input unit 930 may further include, in addition to the touch panel 931, other input devices 932. Specifically, the other input devices 932 may include, but are not limited to, one or more of a physical keyboard, a functional key (such as a volume control key and a switch key), etc.

The display unit 940 may be configured to display information input by the user or information provided for the user or various menus of the mobile phone. The display unit 940 may include a display panel 941. In an embodiment, the display panel 941 may be configured in a form of a Liquid Crystal Display (LCD), an Organic Light-Emitting Diode (OLED), etc. In an embodiment, the touch panel 931 may cover the display panel 941, when the touch panel 931 detects the touch operation thereon or nearby, the touch operation is transmitted to the processor 980 to determine the type of a touch event, and then the processor 980 provides a corresponding visual output on the display panel 941 according to the type of the touch event. Although the touch panel 931 and the display panel 941 implement input of the mobile phone and input functions by serving as two independent parts in FIG. 9, the touch panel 931 and the display panel 941 may be integrated to implement the input of the mobile phone and the input functions in some embodiments.

The mobile phone 900 may further include at least one sensor 950 such as a light sensor, a motion sensor and other sensors. Specifically, the light sensor may include an ambient light sensor and a proximity sensor, wherein the ambient light sensor may adjust the luminance of the display panel 941 according to the brightness of ambient light, and the proximity sensor may close the display panel 941 and/or backlight. The motion sensor may include an accelerometer sensor, which may detect the magnitude of an accelerated speed in each direction and may detect the size and direction of a gravity while resting. The accelerometer sensor may be configured to identify an APP of a mobile phone gesture (e.g., horizontal and vertical screen switching), and vibration identification relevant functions (e.g., pedometer and knocking). In addition, the mobile phone may also be configured with other sensors such as a gyroscope sensor, a barometer sensor, a hygrometer sensor, a thermometer sensor and an infrared sensor.

The audio circuit 960, a loudspeaker 961 and a microphone 962 may provide an audio interface between the user and the mobile phone. The audio circuit 960 may transmit an electric signal converted from the received audio data to the loudspeaker 961, and the loudspeaker 961 converts the electric signal into a sound signal for output. Besides, the microphone 962 converts a collected sound signal into an electric signal, the audio circuit 960 converts the received electric signal into audio data and then outputs the audio data to the processor 980 for processing, the audio data is transmitted to another mobile phone via the RF circuit 910, or the audio data is output to the memory 920 for further processing.

WiFi belongs to a short-range wireless transmission technology, the mobile phone may assist the user in E-mail receiving and sending, webpage browsing, access to streaming media and the like by means of the WiFi module 970, and it provides a wireless wideband internet access for the user. Although FIG. 9 shows the WiFi module 970, it may be understood that the WiFi module does not belong to necessary components of the mobile phone 900 and can be omitted as required.

The processor 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. In an embodiment, the processor 980 may include one or more processing units. In an embodiment, the processor 980 may be integrated with an application processor and a modulation-demodulation processor, wherein the application processor mainly processes an operation system, a user interface, an application program and the like, and the modulation-demodulation processor mainly processes wireless communication. It may be understood that the modulation-demodulation processor may not be integrated into the processor 980. For example, the processor 980 may integrate an application processor and a baseband processor, and the baseband processor and other peripheral chips may constitute the modulation-demodulation processor. The mobile phone 900 may further include a power supply 990 (such as a battery) for supplying power to each component. Preferably, the power supply may be connected with the processor 980 logically via a power supply management system, so as to implement functions of charging, discharging and power consumption management by means of the power supply management system.

In an embodiment, the mobile phone 900 may further include a camera, a Bluetooth module and the like.

In the embodiments of the disclosure, the processor included by the mobile phone executes the computer program stored on the memory to implement the above-described method for processing a memory.

Any reference used in the disclosure to a memory, storage, a database or other media may include non-volatile and/or volatile memories. The appropriate non-volatile memory may include a ROM, a Programmable ROM (PROM), an Electrically Programmable ROM (EPROM), an Electrically Erasable Programmable ROM (EEPROM), or a flash memory. The volatile memory may include a RAM, used as an external cache memory. As being illustrative instead of being limitative, the RAM may be obtained in multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiment only describes several implementation manners of the disclosure more specifically and in more detail, but cannot be thus understood as limitation to the patent scope of the disclosure. It should be pointed out that those of ordinary skill in the art may also make several variations and improvements without departing from the concept of the disclosure. These variations and improvements fall within the scope of protection of the disclosure. Therefore, the scope of protection of the disclosure should be defined by the appended claims.

The invention claimed is:

1. A method for processing a memory, the method being carried out by an electronic device, and comprising:
   acquiring a plurality of reclaimable memory pages occupied by an application to be processed;
   acquiring an idle duration of the application to be processed for each reclaimable memory page;
   acquiring correspondences between re-starting durations and reclaiming proportions corresponding to the application to be processed, the re-starting duration being a duration for restarting the application to be processed after the reclaiming proportion of the reclaimable memory pages occupied by the application to be processed are reclaimed;
   determining a reclaiming proportion of reclaimable memory pages according to the correspondences between reclaiming proportions and re-starting durations;
   determining a reclaiming number according to the reclaiming proportion and the total number of the reclaimable memory pages;
   selecting the Kth-largest idle duration from the idle durations for the plurality of reclaimable memory pages according to the reclaiming number, and taking the Kth-largest idle duration as a duration threshold, the number of reclaimable memory pages each having an idle duration greater than the Kth-largest idle duration being the reclaiming number, K being a natural number not greater than the reclaiming number; and
   reclaiming at least one memory page, for which the idle duration exceeds the duration threshold, of the plurality of reclaimable memory pages.

2. The method of claim 1, wherein the acquiring an idle duration of the application to be processed for each reclaimable memory page comprises:
   acquiring update time recorded by a timestamp of each reclaimable memory page, the update time indicating time when the reclaimable memory page was used most recently; and calculating an idle duration for the reclaimable memory page according to the update time.

3. The method of claim 2, wherein the acquiring update time recorded by a timestamp of each reclaimable memory page comprises:
   for each reclaimable memory page, creating, by a resource priority and limitation management module in the electronic device, a timestamp for recording an update time of the reclaimable memory page; and in responsive to that use of the reclaimable memory page is detected, updating the time stamp for the reclaimable memory page.

4. The method of claim 3, wherein the use of the reclaimable memory page is detected when at least one of allocation of the reclaimable memory page, recovery of the reclaimable memory page, release of the reclaimable memory page, or querying of using condition of a cache in a processor of the electronic device is detected.

5. The method of claim 1, wherein the acquiring an idle duration of the application to be processed for each reclaimable memory page comprises:

providing a Least Recently Used (LRU) management unit in a memory management unit or a cache unit in a processor of the electronic device;

recording, by the LRU management unit, a plurality of memory addresses and update time of each memory address;

acquiring an update time of each of the plurality of reclaimable memory pages according to an update time of a memory address corresponding to the reclaimable memory page; and calculating an idle duration for the reclaimable memory page according to the update time of the reclaimable memory page.

6. The method of claim 1, wherein the acquiring a plurality of reclaimable memory pages occupied by an application to be processed comprises:

traversing a plurality of memory-mapped files of the application to be processed;

querying, in the plurality of memory-mapped files, all memory pages occupied by the application to be processed; and eliminating a memory page carrying an occupation mark from all the memory pages to acquire reclaimable memory pages from memory pages other than the eliminated memory page.

7. The method of claim 1, wherein before the acquiring a plurality of reclaimable memory pages occupied by an application to be processed, the method further comprises:

detecting whether a foreground application depends on the application to be processed;

if a foreground application depends on the application to be processed, adjusting the priority of the application to be processed to match the foreground application; and if a foreground application does not depend on the application to be processed, performing the operation of acquiring reclaimable memory pages occupied by an application to be processed.

8. An electronic device comprising a storage having stored thereon a computer program and a processor, the storage having stored thereon a computer program that when executed by the processor causes the processor to perform operations of:

acquiring a plurality of reclaimable memory pages occupied by an application to be processed;

acquiring an idle duration of the application to be processed for each reclaimable memory page;

acquiring correspondences between re-starting durations and reclaiming proportions corresponding to the application to be processed, the re-starting duration being a duration for restarting the application to be processed after the reclaiming proportion of the reclaimable memory pages occupied by the application to be processed are reclaimed;

determining a reclaiming proportion of reclaimable memory pages according to the correspondences between reclaiming proportions and re-starting durations;

determining a reclaiming number according to the reclaiming proportion and the total number of the reclaimable memory pages;

selecting the Kth-largest idle duration from the idle durations for the plurality of reclaimable memory pages according to the reclaiming number, and taking the Kth-largest idle duration as a duration threshold, the number of reclaimable memory pages each having an idle duration greater than the Kth-largest idle duration being the reclaiming number, K being a natural number not greater than the reclaiming number; and reclaiming at least one memory page, for which the idle duration exceeds the duration threshold, of the plurality of reclaimable memory pages.

9. The electronic device of claim 8, wherein the acquiring an idle duration of the application to be processed for each reclaimable memory page comprises:

acquiring update time recorded by a timestamp of each reclaimable memory page, the update time indicating time when the reclaimable memory page was used most recently; and calculating an idle duration for the reclaimable memory page according to the update time.

10. The electronic device of claim 9, wherein the acquiring update time recorded by a timestamp of each reclaimable memory page comprises:

for each reclaimable memory page, creating, by a resource priority and limitation management module in the electronic device, a timestamp for recording an update time of the reclaimable memory page; and in responsive to that use of the reclaimable memory page is detected, updating the time stamp for the reclaimable memory page.

11. The electronic device of claim 10, wherein the use of the reclaimable memory page is detected when at least one of allocation of the reclaimable memory page, recovery of the reclaimable memory page, release of the reclaimable memory page, or querying of using condition of a cache in a processor of the electronic device is detected.

12. The electronic device of claim 8, wherein the acquiring an idle duration of the application to be processed for each reclaimable memory page comprises:

providing a Least Recently Used (LRU) management unit in a memory management unit or a cache unit in a processor of the electronic device;

recording, by the LRU management unit, a plurality of memory addresses and update time of each memory address;

acquiring an update time of each of the plurality of reclaimable memory pages according to an update time of a memory address corresponding to the reclaimable memory page; and calculating an idle duration for the reclaimable memory page according to the update time of the reclaimable memory page.

13. The electronic device of claim 8, wherein the acquiring a plurality of reclaimable memory pages occupied by an application to be processed comprises:

traversing a plurality of memory-mapped files of the application to be processed;

querying, in the plurality of memory-mapped files, all memory pages occupied by the application to be processed; and eliminating a memory page carrying an occupation mark from all the memory pages to acquire reclaimable memory pages from memory pages other than the eliminated memory page.

14. A non-transitory computer-readable storage medium having a computer program stored thereon that when executed by a processor, causes the processor to implement a method, the method comprising:

acquiring a plurality of reclaimable memory pages occupied by an application to be processed;

acquiring an idle duration of the application to be processed for each reclaimable memory page;

acquiring correspondences between re-starting durations and reclaiming proportions corresponding to the application to be processed, the re-starting duration being a duration for restarting the application to be processed after the reclaiming proportion of the reclaimable memory pages occupied by the application to be processed are reclaimed;

determining a reclaiming proportion of reclaimable memory pages according to the correspondences between reclaiming proportions and re-starting durations;

determining a reclaiming number according to the reclaiming proportion and the total number of the reclaimable memory pages;

selecting the Kth-largest idle duration from the idle durations for the plurality of reclaimable memory pages according to the reclaiming number, and taking the Kth-largest idle duration as a duration threshold, the number of reclaimable memory pages each having an idle duration greater than the Kth-largest idle duration being the reclaiming number, K being a natural number not greater than the reclaiming number; and reclaiming at least one memory page, for which the idle duration exceeds the duration threshold, of the plurality of reclaimable memory pages.

* * * * *